United States Patent [19]
Zoglmeyr

[11] 3,959,532
[45] May 25, 1976

[54] CARBON IMPREGNATION OF BURNED MAGNESITE BRICKS
[75] Inventor: Gunter Zoglmeyr, Radenthein, Austria
[73] Assignee: Osterreichisch-Amerikanische Magnesit Aktiengesellschaft, Austria
[22] Filed: July 10, 1974
[21] Appl. No.: 487,028

[30] Foreign Application Priority Data
July 12, 1973 Austria .............................. 6165

[52] U.S. Cl. ............................... 427/372; 427/430; 427/294; 106/56
[51] Int. Cl.² ....................................... C04B 35/52
[58] Field of Search .......... 106/56; 117/160 A, 226; 427/430, 372

[56] References Cited
UNITED STATES PATENTS
1,916,333  7/1933  Rose et al ...................... 117/160 A FOREIGN PATENTS OR APPLICATIONS
1,124,630  8/1968  United Kingdom .................. 106/56
1,046,661  10/1966  United Kingdom .................. 106/56
772,519  4/1957  United Kingdom .................. 106/56

Primary Examiner—Winston A. Douglas
Assistant Examiner—William G. Wright
Attorney, Agent, or Firm—Everett H. Murray, Jr.; Brian G. Brunsvold, Jr.

[57] ABSTRACT
Burned magnesite bricks are impregnated with an aqueous dispersion of carbon black, and then dried using hot dry air at a temperature above about 100°C.

7 Claims, No Drawings

CARBON IMPREGNATION OF BURNED MAGNESITE BRICKS

The invention concerns a method for the production of burnt magnesite bricks which are impregnated with carbonaceous substances.

It is already known to impregnate burnt basic refractory bricks, like magnesite bricks, with tar, pitch or similar carbonaceous substances in order to increase their durability. On heating in a neutral or reducing atmosphere the carbonaceous substances are decomposed, and the carbon formed, the so-called residual carbon, remains in the pores and fills the latter more or less. This residual carbon reduces considerably the wear of impregnated bricks, compared to non-impregnated bricks of the same material, the more so the more completely the pores of the bricks are filled with carbon. It is therefore tried principally to introduce as much carbon as possible into the bricks, and for this reason liquid or molten substances with a high carbon yield are used for the impregnation.

It was found in practice that if tar, pitch etc. are used for impregnating the bricks, we must accept not only the filling of the pores of the brick, but also a certain deposit of high-molecular components of the impregnating agents on the brick surface in the form of layers, schlieren or drops. In general, the tendency to such deposits on the brick surface increases with increasing anthracene-insoluble matter in the impregnating agents used. On the other hand, however, the carbon yield increases with an increase of the anthracene-insoluble matter in the impregnating agent. With the general tendency toward greater amounts of residual carbon in the bricks, which can be achieved by increasing the content of the anthracene-insoluble matter, the difficulties increase therefore which result from the formation of deposits on the brick surface. These difficulties manifest themselves substantially in an additional expansion and in irregularities in the lining. Their elimination requires expensive re-coating of the bricks in an atmosphere which is injurious to health or which represents a health hazard.

In order to avoid these inconveniences it has already been suggested to use for the production of refractory burnt magnesite bricks as an impregnating agent a colloidal, alcoholic dispersion of a solid, such as an alcoholic dispersion of carbon, silica, alumina or magnesium hydroxide. But the disadvantage of this method is that alcoholic dispersions cannot be used in a ceramic mass production facility, primarily because of their fire hazard, but also because of their high cost.

It is an object of the invention to create a process for the production of fired magnesite bricks which are impregnated with carboniferous materials, said process avoiding the disadvantages inherent in the above mentioned known methods of this kind. It was found that success is achieved if the fired bricks are impregnated with an aqueous carbon black dispersion and dried after impregnation by means of dry, hot air of at least 100°C, preferably at least 150°C.

The advantage of the process according to the invention over the known processes of impregnation with tar, pitch or the like are that it is much simpler and also much more convenient to carry out than impregnation with hot, ill-smelling tar or pitch. Compared to the other known impregnation processes with alcoholic dispersions, it has the advantages of involving no hazards and being much less costly. It is possible by means of the process according to the invention to obtain very high residual carbon contents in the bricks, as otherwise obtainable only by the use of pitch with a high content of anthraceneinsolubles or by immersion or impregnation repeated several times in succession. The bricks do not have to be heated prior to impregnation with a carbon black dispersion. This obviates the cost of supplying and storing hot pitch or tar, as well as the installation of exhausts to remove tar vapors from the plant and from the working halls in which the hot bricks are handled after the impregnation, is likewise not necessary. If the impregnation of the bricks is effected under pressure, it is possible to work in a normal atmosphere, and the use of nitrogen is unnecessary. Recoating of the bricks impregnated with a carbon black dispersion according to the invention is not necessary.

In the method according to the invention it is generally advisable to use a high-percentage carbon black dispersion, but the amount of residual carbon remaining in the pores of the bricks can be regulated by adjusting the carbon black content of this dispersion, for example, by diluting a concentrated dispersion. Preferably an aqueous dispersion with a content of 30 to 50%, particularly 35 to 40% carbon black is used, whose remaining components are formed by water and dispersing agents and stabilizers (the latter two ab. 5% in mm). The mean particle size of the carbon black must be below the minimum pore size, hence under about 500 m mu. Highly suitable are carbon blacks with a particle size of under 50 m mu, for example, 20 to 30 m mu.

The impregnation is preferably effected after evacuation of the brick by exposure to a vacuum. During the impregnation step, the application of pressure on the carbon black dispersion helps increase the speed of penetration into the brick. The bricks are dried with dry hot air of at least 100°C, preferably over 180°C. It is important that the hot air is exhausted, after it has come in contact with the material to be dried, and is not circulated. This way hydration of the impregnated bricks can be positively avoided, since the dispersing agent and the stabilizer used as well as the thin carbon black coat formed on the brick surface have a certain protective effect.

By dipping or impregnation with tar or pitch, it is possible to obtain in the bricks residual carbon contents (coking according to ASTM C 607 – 67) of 1.2 to 2.0%, by impregnation with a carbon black dispersion, however, 1.8 to 2.5%. In order to obtain particularly high carbon contents, the impregnation of the bricks can also be effected in the method according to the inventon several times in succession, and the bricks are dried with advantage between the individual impregnations. Furthermore, it is possible to impregnate a brick with tar or pitch, after it has been impregnated with a carbon black dispersion according to the invention and dried.

The bricks obtained with the method according to the invention can be used with advantage for lining metallurgical vessels for BOF and bottom-blowing steel production processes, vessels for degasification methods, also with electric arc furnaces, and in pig iron mixers and ladles.

The invention will be described more fully on the basis of the following example.

EXAMPLE

Three magnesite bricks of different composition, which are designated in the following table as brick No. 1, 2 and 3, were first impregnated with an aqueous dispersion containing 35% carbon black and about 5% polyglycol ether as a dispersing medium, using a vacuum and with subsequent application of pressure, and then dried in a drier traversed by exhaust gas at about 180°C for 5 hours. Subsequently, the carbon content in the various zones of the bricks was determined. The carbon black used had a particle size of 20 to 30 m mu, a mean particle size of 27 m mu, a viscosity of 0.13P, and a flow limit of 0.14 dyn/qcm.

The analysis and the test data of the three bricks were as follows:

| BRICK | 1 | 2 | 3 |
|---|---|---|---|
| Chemical analysis in % | | | |
| $SiO_2$ | 1.32 | 1.19 | 1.02 |
| $Fe_2O_3$ | 0.47 | 1.44 | 4.50 |
| $Al_2O_3 + Mn_3O_4$ | 0.15 | 0.32 | 0.78 |
| $Cr_2O_3$ | 0.12 | 0.16 | 0.17 |
| CaO | 2.51 | 2.39 | 2.19 |
| MgO | 95.43 | 94.50 | 91.34 |
| Physical test data before impregnation. | | | |
| Volumetric weight (RG) (Pukall), g/cc | 2.95 | 2.94 | 2.92 |
| Water absorption (W) % | 5.4 | 5.7 | 6.0 |
| Porosity (Ps) % | 16.4 | 16.7 | 17.7 |
| Cold compressive strength (KDF) kp/qcm | 458 | 627 | 765 |
| Physical test data after impregnation. | | | |
| RG (Pukall) g/cc | 3.01 | 3.00 | 2.98 |
| W, % | 4.0 | 4.3 | 4.3 |
| Ps, % | 12.0 | 12.9 | 12.8 |
| KDF, kg/qcm | 463 | 645 | 729 |
| Zone analysis for carbon after impregnation, % C | | | |
| Brick thickness mm | 120 | 130 | 110 |
| 0 – 10 | 2.22 | 2.19 | 2.53 |
| 10 – 20 | 2.21 | 2.07 | 2.21 |
| 20 – 30 | 2.26 | 2.02 | 1.95 |
| 30 – 40 | 2.18 | 2.06 | 1.96 |
| 40 – 50 | 1.80 | 1.93 | 1.95 |
| 50 – 60 | 1.83 | 1.96 | 1.93 |
| 60 – 70 | 1.84 | 2.03 | 2.00 |
| 70 – 80 | 2.24 | 2.03 | 1.93 |
| 80 – 90 | 2.24 | 2.09 | 1.91 |
| 90 – 10 | 2.31 | 2.07 | 2.01 |
| 100 – 110 | 2.16 | 2.10 | 2.24 |
| 110 – 120 | 2.20 | 2.13 | — |
| 120 – 130 | — | 2.22 | — |

For comparison, bricks of the above composition were impregnatead with a tar with a content of 3.55% anthraceneinsoluble matter and analyzed after the ASTM coking. The following contents of residual carbon were obtained:

| brick | 1 | 2 | 3 |
|---|---|---|---|
| residual carbon % | 1.60 | 1.53 | 1.40 |

These results show that the impregnation according to the invention with carbon black dispersions yields higher contents of residual carbon than the conventional impregnation of the bricks with tar or pitch. Beyond that, relatively high contents of carbon are obtained by impregnation with carbon black dispersions, particularly in the edge zones of the bricks, and this manifests itself in a reduced wear of the joints in the linings consisting of such bricks.

What is claimed is:

1. An improved process for impregnating burned magnesite bricks with a carbonaceous material comprising impregnating the burned brick with an aqueous dispersion of carbon black and drying the impregnated brick with hot dry air having a temperature of at least 100°C.

2. The process of claim 1 in which the aqueous dispersion of carbon black contains 30–50% by weight carbon black.

3. The process of claim 2 in which the aqueous dispersion of carbon black contains 35–40% by weight carbon black.

4. The process of claim 1 in which the temperature of the air is at least 180°C.

5. The process of claim 1 in which the aqueous dispersion of carbon black comprises by weight 30–50% carbon black, 45–65% water and 1–10% dispersing agent.

6. The process of claim 5 in which the dispersing agent is polyglycol ether.

7. The process of claim 1 in which the carbon black in the aqueous dispersion has a mean particle size under about 50 m mu.

\* \* \* \* \*